(12) United States Patent
Kim

(10) Patent No.: US 8,892,038 B2
(45) Date of Patent: Nov. 18, 2014

(54) METHOD FOR SEARCHING AND CONNECTING BLUETOOTH DEVICES AND APPARATUS USING THE SAME

(75) Inventor: Jong Hwan Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 636 days.

(21) Appl. No.: 12/657,891

(22) Filed: Jan. 29, 2010

(65) Prior Publication Data

US 2010/0190440 A1    Jul. 29, 2010

(30) Foreign Application Priority Data

Jan. 29, 2009   (KR) ........................ 10-2009-0006864

(51) Int. Cl.
*H04B 7/00*    (2006.01)
*H04W 8/00*    (2009.01)
*H04M 1/725*   (2006.01)

(52) U.S. Cl.
CPC ............ *H04M 1/7253* (2013.01); *H04W 8/005* (2013.01); *H04M 2250/02* (2013.01)
USPC .......... 455/41.2; 455/410; 455/517; 455/516; 455/515

(58) Field of Classification Search
USPC .......... 455/41.2, 410, 517, 515, 516; 726/22; 370/328, 201, 310; 711/113, 202, 220; 340/10.1, 10.42
See application file for complete search history.

(56) References Cited

U.S. PATENT DOCUMENTS

| | | | |
|---|---|---|---|
| 7,324,804 B2 * | 1/2008 | Hrastar et al. | 455/410 |
| 7,356,347 B1 * | 4/2008 | Kammer | 455/517 |
| 7,590,086 B2 * | 9/2009 | Olkkonen et al. | 370/328 |
| 2003/0159070 A1 * | 8/2003 | Mayer et al. | 713/201 |
| 2004/0162804 A1 * | 8/2004 | Strittmatter et al. | 707/1 |
| 2004/0203363 A1 * | 10/2004 | Carlton et al. | 455/41.2 |
| 2006/0128305 A1 * | 6/2006 | Delalat | 455/41.2 |
| 2006/0229014 A1 * | 10/2006 | Harada et al. | 455/41.2 |
| 2007/0141984 A1 * | 6/2007 | Kuehnel et al. | 455/41.2 |
| 2007/0141986 A1 * | 6/2007 | Kuehnel et al. | 455/41.2 |
| 2007/0141988 A1 * | 6/2007 | Kuehnel et al. | 455/41.2 |
| 2009/0097388 A9 * | 4/2009 | Linde et al. | 370/201 |
| 2009/0130977 A1 * | 5/2009 | Grushkevich et al. | 455/41.2 |
| 2009/0264070 A1 * | 10/2009 | Lim | 455/41.2 |

FOREIGN PATENT DOCUMENTS

KR    10-0870958    11/2008

* cited by examiner

Primary Examiner — April G Gonzales

(57) ABSTRACT

A Bluetooth master device is capable of performing search and connection method for Bluetooth devices. The Bluetooth master device receives device information from at least one Bluetooth device in response to a Bluetooth device search request made by a user. A responding Bluetooth device that is capable of providing a Bluetooth service in a preset service list is selected. The Bluetooth master device sends a name request signal to the selected Bluetooth device and displays a device name received from the selected Bluetooth device.

20 Claims, 4 Drawing Sheets

METHOD FOR SEARCHING AND CONNECTING BLUETOOTH DEVICES AND APPARATUS USING THE SAME

CROSS-REFERENCE TO RELATED APPLICATION(S) AND CLAIM OF PRIORITY

The present application is related to and claims priority to an application entitled "METHOD FOR SEARCHING AND CONNECTING BLUETOOTH DEVICES AND APPARATUS USING THE SAME" filed in the Korean Intellectual Property Office on Jan. 29, 2009 and assigned Serial No. 10-2009-0006864, the contents of which are incorporated herein by reference.

TECHNICAL FIELD OF THE INVENTION

The present invention relates generally to Bluetooth® capable devices and, more particularly, to a search and connection method for Bluetooth® devices that enables efficient search for a desired Bluetooth® device while blocking connection with an undesired Bluetooth® device, and an apparatus employing the same.

BACKGROUND OF THE INVENTION

Advances in wireless communication technology have enabled development of low-cost and low-power wireless devices and links. Bluetooth® is a representative short-range communication scheme that enables low-cost and low-power voice and data communication between devices.

In typical Bluetooth® communication, a master device and multiple slave devices are interconnected to form a piconet. The master device initiates Bluetooth® communication by sending a Bluetooth® signal, and a slave device receives the Bluetooth® signal from the master device and communicates with the master device.

A Bluetooth® device desiring to be a master may set a frequency hopping sequence and broadcast an inquiry signal carrying the frequency hopping sequence to search for another Bluetooth® device in the vicinity. A Bluetooth® device conducting an inquiry scan may respond to the inquiry signal by sending an inquiry response signal carrying Bluetooth® Device Address (BD_ADDR) and clock information to the inquiring Bluetooth® device.

In the case where a few Bluetooth® devices are present in the vicinity, the number of responding Bluetooth® devices is small, and the inquiring Bluetooth® device may list most of the responding Bluetooth® devices on the display screen. The user of the inquiring Bluetooth® device may readily select a desired one of the listed Bluetooth® devices for communication. However, in the case where many Bluetooth® devices are present in the vicinity, the number of responding Bluetooth® devices may be not small and the inquiring Bluetooth® device may have to spend a long time to finish the inquiry procedure. In particular, when the inquiry list presented by the inquiring Bluetooth® device is limited in number of Bluetooth® devices, a Bluetooth® device desired by the user may be not present in the inquiry list. Hence, it is necessary to develop a method that enables efficient discovery of a desired Bluetooth device when many Bluetooth® devices are present in the vicinity.

Additionally, in the case when a first Bluetooth® device had communicated with a second Bluetooth® device in the past or the second Bluetooth® device is aware of the first Bluetooth® device, the second Bluetooth® device may repeatedly try to connect to the first Bluetooth® device even when the user of the first Bluetooth® device desires not to connect to the second Bluetooth® device. That is, the second Bluetooth® device may interfere with the first Bluetooth® device, preventing efficient Bluetooth® communication. Hence, it is necessary to develop a method that may effectively block connection with an undesired Bluetooth® device.

SUMMARY OF THE INVENTION

To address the above-discussed deficiencies of the prior art, it is a primary object to provide a method that enables efficient discovery of a desired Bluetooth® device.

The present invention also provides a method that may efficiently block connection with an undesired Bluetooth® device.

The present invention further provides an apparatus employing the above methods.

In accordance with an exemplary embodiment of the present invention, there is provided a Bluetooth® device search method, including: receiving device information from at least one Bluetooth® device in response to a Bluetooth® device search request made by a user; sorting at least one Bluetooth® device that is capable of providing a Bluetooth® service included in a preset service list among the at least one responding Bluetooth device; transmitting a device name request signal to the at least one sorted Bluetooth® device; and displaying the at least one received device name.

In accordance with another exemplary embodiment of the present invention, there is provided a Bluetooth® device connection method, including: receiving a connection request signal from a Bluetooth® device; determining whether the requesting Bluetooth® device is present in a connection blocking list; and blocking, when the requesting Bluetooth® device is present in the connection blocking list, transmission of a connection response signal to the requesting Bluetooth® device, and sending, when the requesting Bluetooth® device is not present in the connection blocking list, a connection response signal to the requesting Bluetooth® device.

In accordance with another exemplary embodiment of the present invention, there is provided a Bluetooth® device connection method, including: receiving a connection request signal from a Bluetooth® device; determining whether the requesting Bluetooth® device is present in a connection blocking list; and pausing, when the requesting Bluetooth® device is present in the connection blocking list, reception of another connection request signal for a preset time, and continuing, when the requesting Bluetooth® device is not present in the connection blocking list, reception of another connection request signal.

In accordance with another exemplary embodiment of the present invention, there is provided an apparatus comprising a Bluetooth® module, including: a storage unit that stores a service list of available Bluetooth® services; a display unit that displays a Bluetooth® device name; and a control unit that controls the Bluetooth® module to receive device information from at least one Bluetooth® device, sorts at least one Bluetooth® device that is capable of providing a Bluetooth® service included in the service list among the at least one responding Bluetooth device, controls the Bluetooth® module to transmit a device name request signal to the at least one sorted Bluetooth® device, controls the Bluetooth module to receive at least one device name form the at least one sorted Bluetooth device and controls the display unit to display the at least one received device name.

In accordance with another exemplary embodiment of the present invention, there is provided an apparatus comprising a Bluetooth® module, including: a storage unit that stores a connection blocking list; and a control unit that controls the Bluetooth® module to receive a connection request signal from a Bluetooth® device, determines whether the requesting Bluetooth® device is present in the connection blocking list, and, when the requesting Bluetooth® device is present in the connection blocking list, blocks transmission of a connection response signal to the requesting Bluetooth® device or pausing reception of another connection request signal for a preset time.

In a feature of the present invention, the time needed to search for Bluetooth® devices may be reduced. In addition, the user may use Bluetooth® communication more effectively by blocking unnecessary connection with an undesired Bluetooth® device.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
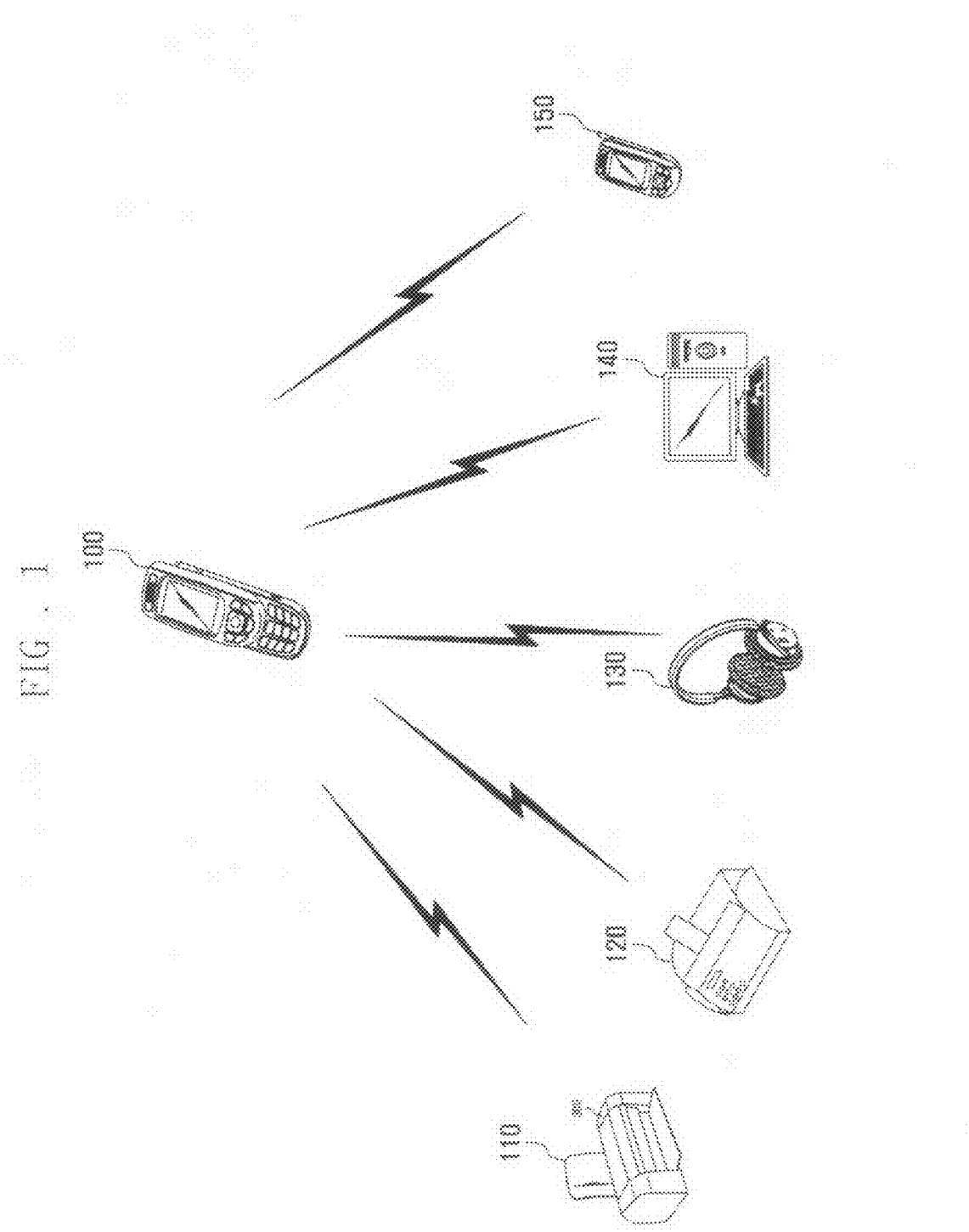
FIG. 1 illustrates Bluetooth® communication between a mobile terminal that includes a Bluetooth® module and other Bluetooth® devices.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device.

In the description, the word "inquiry" refers to broadcasting an "inquiry signal" by a master device to discover a connectable Bluetooth device in the vicinity. The master device broadcasts an inquiry signal over a pseudo randomly selected one of multiple radio frequency channels. The inquiry signal may carry Bluetooth® device address (BD_ADDR) and clock information of the sender.

The words "inquiry scan" refer to listening, by a potential slave device, for an inquiry signal from a master device. A slave device may conduct inquiry scan on one of multiple radio frequency channels for a preset time to listen for an inquiry signal from a master device. Upon expiration of the preset time without receiving an inquiry signal, the slave device conducts inquiry scan on another radio frequency channel. When the master device and slave device use the same radio frequency channel, the slave device may receive an inquiry signal. Upon reception of an inquiry signal, the slave device may send an "inquiry response signal" to the master device. The inquiry response signal may carry device address information (BD_ADDR), clock information and device class information (Class of Device) of the responder.

The word "page" refers to sending, by the master device, a "paging signal" to a particular slave device on the basis of device address information and clock information contained in an inquiry response signal from the slave device to establish a communication channel. The paging signal may carry device address information and clock information of the sender.

The words "page scan" refer to listening, by a slave device, for a paging signal from the master device. Upon reception of a paging signal, the slave device may send a "paging response signal" carrying Device Access Code (DAC) information to the master device.

The words "service list" refer to a list of Bluetooth services. The user may make a service list through a service setting menu. The service list may include information regarding Bluetooth® services provided by the Bluetooth® devices. The service list may further include priority information. The user may assign priority values to Bluetooth® services in order of frequency of use. The user may assign a unique priority value to each Bluetooth® service or assign the same priority value to multiple Bluetooth® services. In the present invention, Bluetooth® services may include services related to headsets, hands-free, file transfer, printing, imaging, LAN access, and faxes, using the Bluetooth technology.

The words "connection blocking list" refer to a list of Bluetooth® devices that the user does not desire to access. The user may create a connection blocking list through a blocking list setting menu. The user may select one of the Bluetooth® devices that the user has communicated with in the past and add the selected Bluetooth® device to the connection blocking list, or may select one of the Bluetooth® devices responding to an inquiry signal and add the selected Bluetooth® device to the connection blocking list.

For the purpose of description, a mobile terminal is described as a representative example of a Bluetooth® device, however, the present invention is not limited thereto. The mobile terminal of the present invention is a terminal that includes a Bluetooth® module, and may be any information and communication appliance or multimedia appliance, such as a mobile communication terminal, portable multimedia player (PMP), personal digital assistant (PDA), smart phone, or MP3 player.

FIG. 1 illustrates Bluetooth® communication between a mobile terminal 100 that includes a Bluetooth® module and other Bluetooth® devices 110 to 150.

Referring to FIG. 1, the mobile terminal 100 includes a Bluetooth® module, and may connect to other Bluetooth® devices 110 to 150 through Bluetooth® communication.

The Bluetooth® protocol operates in the industrial, scientific and medical (ISM) band of 2.4 GHz. The ISM band may be freely used without a license. A lower guard band of 2 MHz wide and an upper guard band of 3.5 MHz wide are provided respectively below and above the 2.4 GHz ISM band to prevent interference with other devices. Bluetooth® uses frequency hopping by dividing the ISM band into multiple channels.

The Bluetooth® devices 110 to 150 may include a printer 110, a fax 120, a headset 130, a computer 140, and a mobile terminal 100. Any device including a Bluetooth® module can function as a Bluetooth® device.

The mobile terminal 100, acting as a master, may broadcast an inquiry signal. Each of the Bluetooth® devices 110 to 150 may receive the inquiry signal from the mobile terminal 100 and send an inquiry response signal to the mobile terminal 100. When an inquiry response signal is received from one of the Bluetooth® devices 110 to 150, the mobile terminal 100 may send a name request (Remote Name Request command) to the responding Bluetooth® device to obtain the friendly device name thereof. Upon reception of the name request, the responding Bluetooth® device may send its friendly device name to the mobile terminal 100. After receiving the friendly device name, the mobile terminal 100 may display the received device name on the display screen and request the user to select a Bluetooth® device. When a Bluetooth® device is selected, the mobile terminal 100 may page the selected Bluetooth® device and establish a connection thereto.

When the mobile terminal 100 tries to connect to a Bluetooth® device to which the mobile terminal 100 previously has connected, the mobile terminal 100 may directly page the Bluetooth® device without performing the inquiry procedure. In the case when a Bluetooth® device has not been connected to the mobile terminal 100 but the mobile terminal 100 has device information of the Bluetooth® device, the mobile terminal 100 may also directly page the Bluetooth® device without performing the inquiry procedure to establish a connection thereto.

Figure 2:
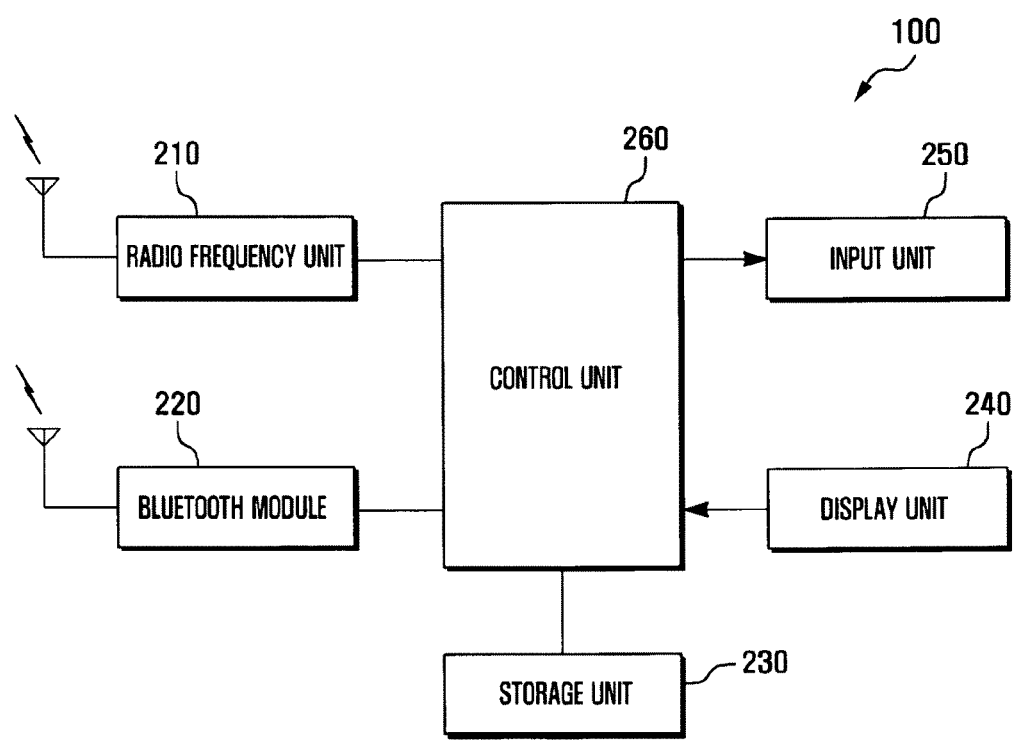
FIG. 2 illustrates a mobile terminal capable of Bluetooth® communication according to an exemplary embodiment of the present invention.

FIG. 2 illustrates a mobile terminal 100 capable of Bluetooth® communication according to an exemplary embodiment of the present invention.

Referring to FIG. 2, the mobile terminal 100 includes a radio frequency unit 210, a Bluetooth module 220, a storage unit 230, a display unit 240, an input unit 250, and a control unit 260.

The radio frequency unit 210 performs wireless data transmission and reception operations for the mobile terminal 100. The radio frequency unit 210 may include a radio frequency transmitter for up-converting the frequency of a signal to be transmitted and amplifying the signal, and a radio frequency receiver for low-noise amplifying a received signal and down-converting the frequency of the received signal. The radio frequency unit 210 may forward data received through a radio channel to the control unit 260, and may transmit data from the control unit 260 through the radio channel.

The Bluetooth® module 220 sends and receives voice and data signals through a radio interface to and from another Bluetooth® device. In the case when the mobile terminal 100 acts as a master device, the Bluetooth® module 220 may transmit an inquiry signal and a paging signal to other Bluetooth® devices in the vicinity under the control of the control unit 260. Each of the inquiry signal and the paging signal carries device address information and clock information of the sender and may be sent as an ID packet. In the case when the mobile terminal 100 acts as a slave device, the Bluetooth® module 220 may perform inquiry scan or page scan under the control of the control unit 260. In the inquiry scan state, the Bluetooth® module 220 may listen for an inquiry signal from the master device, and send, after reception of an inquiry signal, an inquiry response signal to the master device. In the page scan state, the Bluetooth® module 220 may listen for a paging signal from the master device, and send, after reception of a paging signal, a page response signal to the master device.

The storage unit 230 stores programs and data necessary for the operation of the mobile terminal 100. In particular, the storage unit 230 may store a service list. The service list contains information regarding available Bluetooth® services of the mobile terminal 100. Available Bluetooth® services may include services related to a headset or hands-free for controlling the mobile terminal 100, file transfer for music and image files, Bluetooth® printing, a local area network (LAN), and a fax machine. The service list may further contain priority information for Bluetooth® services. The service list may contain available Bluetooth® services of the mobile terminal 100 in whole or in part. Priority values may be assigned to only some Bluetooth® services in the service list. The same priority value may be assigned to a group of Bluetooth® services. For example, a headset service and a file transfer service may have the same (highest) priority value.

The storage unit 230 may store a connection blocking list. The connection blocking list contains information regarding Bluetooth® devices with which the user of the mobile terminal 100 does not desire to communicate. The user may create a connection blocking list through a blocking list setting menu. The user may select one of the Bluetooth® devices that have been connected to the mobile terminal 100 and add the selected Bluetooth® device to the connection blocking list. The user may also select one of the Bluetooth® devices responding to an inquiry signal and add the selected Bluetooth® device to the connection blocking list. The connection blocking list may contain device address information of Bluetooth® devices.

The display unit 240 may be realized using liquid crystal display (LCD) technology. The display unit 240 displays menus of the mobile terminal 100, input data, function setting information and various other information. For example, the display unit 240 may display a boot screen, an idle screen, a call handling screen, and other application control screens. In particular, the display unit 240 may display information regarding discovered Bluetooth® devices under the control of the control unit 260. The display unit 240 may display a service list setting menu or a blocking list setting menu. The service list setting menu is related to a list of available Bluetooth® services of the mobile terminal 100. The blocking list setting menu is related to a list of Bluetooth® devices that have been connected to the mobile terminal 100 or are discovered through the inquiry procedure.

The input unit 250 receives a key manipulation signal for operating the mobile terminal 100 from the user and sends the key manipulation signal to the control unit 260. The input unit 250 may include a keypad including alphanumeric keys and direction keys and may further include a touch pad for a touch screen. The input unit 250 may further include sensors such as an image sensor and an acceleration sensor. In particular, the user may enter a command for discovering Bluetooth® devices through the input unit 250.

The control unit 260 controls the overall operation of the mobile terminal 100. In particular, the control unit 260 may make a service list according to a user request and store the service list in the storage unit 230. The control unit 260 may control the Bluetooth® module 220 to broadcast an inquiry signal and to receive an inquiry response signal from at least one Bluetooth® device. The control unit 260 may select a Bluetooth® device that can provide a Bluetooth® service in the service list. The control unit 260 may control the Bluetooth® module 220 to send a name request to the selected Bluetooth® device and to receive the friendly device name therefrom. The control unit 260 may control the display unit 240 to display the received friendly device name.

In addition, the control unit 260 may make a connection blocking list according to a user request and store the connection blocking list in the storage unit 230. The control unit 260 may control the Bluetooth® module 220 to listen for a paging signal from a master device. Upon reception of a paging signal, the control unit 260 checks whether the device address information of the paging device is present in the connection blocking list. The control unit 260 may determine whether to send a page response signal on the basis of the checked result. The control unit 260 may also determine whether to continue or finish page scan on the basis of the checked result.

Figure 3:
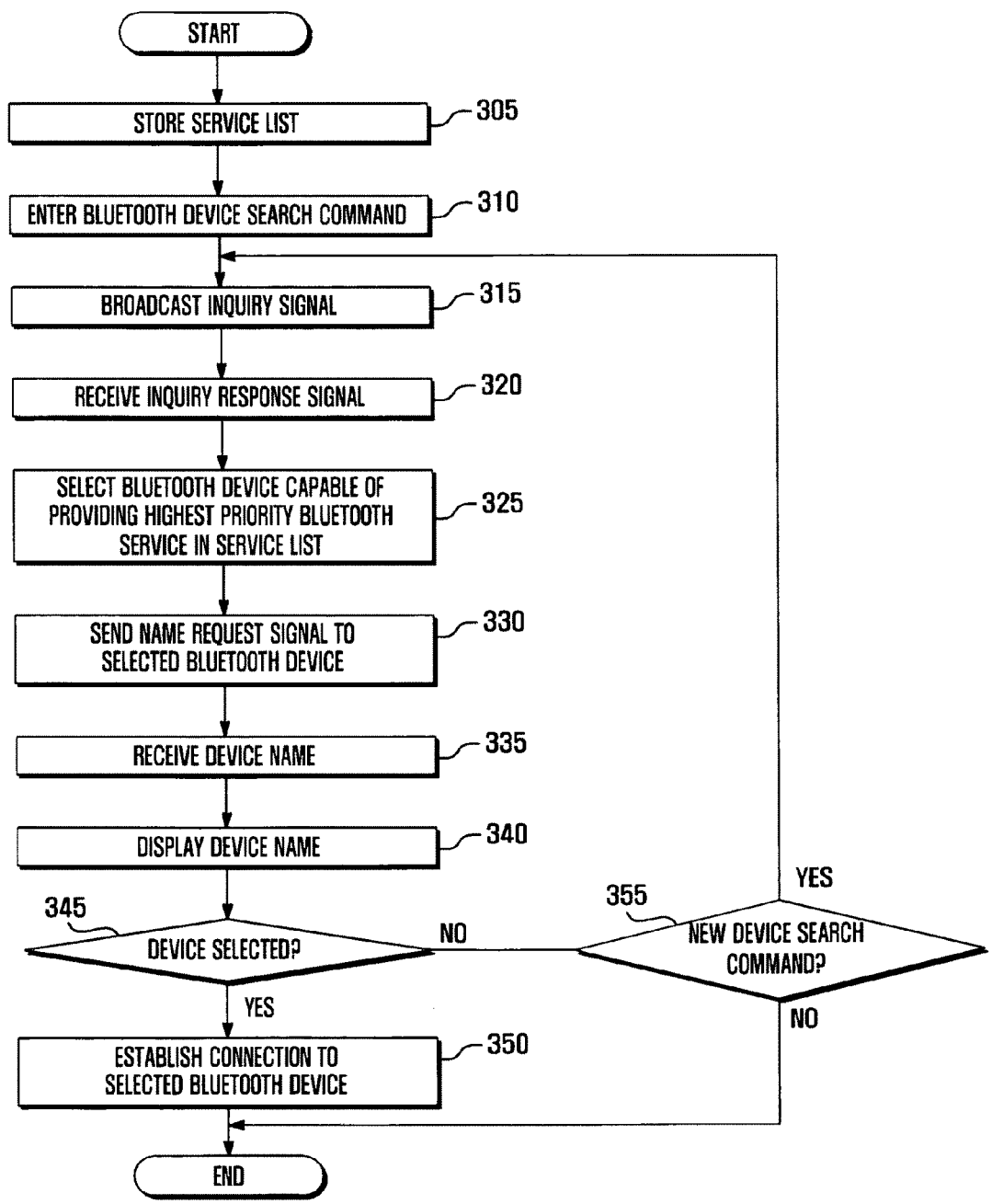
FIG. 3 illustrates a Bluetooth® device search method according to another exemplary embodiment of the present invention.

FIG. 3 illustrates a Bluetooth® device search method according to another exemplary embodiment of the present invention. FIG. 3 depicts a case that the mobile terminal 100 acts as a master device.

Referring to FIG. 3, the control unit 260 of the mobile terminal 100 makes a service list according to a user request and stores the service list in the storage unit 230 (block 305). The user may use the service list setting menu to set the service list.

When the user selects the service list setting menu, the control unit 260 controls the display unit 240 to display a service list setting screen, which includes a list of available Bluetooth® services. The user may add some or all of available Bluetooth® services to the service list. The user may assign different or identical priority values to Bluetooth® services in the service list. The service list may be set before or after initiating Bluetooth® device discovery. For example, when the user enters a Bluetooth® device search command through the input unit 250, the control unit 260 may control the display unit 240 to display a list of Bluetooth® services. When the user selects a desired Bluetooth® service, the control unit 260 may control the Bluetooth® module 220 to broadcast an inquiry signal to find a Bluetooth® device supporting the selected service.

The control unit 260 receives a Bluetooth® device search command from the user (block 310). The user may enter a Bluetooth® device search command through the input unit 250.

The control unit 260 controls the Bluetooth® module 220 to broadcast an inquiry signal (block 315). The inquiry signal carries device address information (BD-ADDR) and clock information of the sender, and is broadcast to unspecified Bluetooth® devices in the vicinity. A Bluetooth® device in the vicinity may receive the inquiry signal and send an inquiry response signal to the mobile terminal 100. The inquiry response signal carries device address information (BD-ADDR) and class of device (COD) information of the sender (i.e. responder). The COD information may include a major service mask and major device mask denoting a Bluetooth® service. For example, a headset service may be described by AUDIO_MAJOR_SERVICE_MASK and AUDIO_MAJOR_DEVICE_MASK.

The control unit 260 controls the Bluetooth® module 220 to receive an inquiry response signal from a Bluetooth® device responding to the inquiry signal (block 320). The control unit 260 may receive up to a specified number of inquiry response signals. The control unit 260 identifies the highest priority Bluetooth® service in the service list, and selects one of the responding Bluetooth® devices that can provide the highest priority Bluetooth® service (block 325). For example, when a headset service is the highest priority Bluetooth® service in the service list, the control unit 260 selects one of the responding Bluetooth® devices that can provide the headset service.

The control unit 260 controls the Bluetooth® module 220 to send a name request signal to the selected Bluetooth® device to obtain the friendly device name thereof (block 330). Upon reception of the name request signal, the selected Bluetooth® device sends a name response signal carrying a friendly device name to the mobile terminal 100.

The control unit 260 controls the Bluetooth® module 220 to receive the name response signal carrying a friendly device name from the selected Bluetooth® device (block 335). The control unit 260 controls the display unit 240 to display the received friendly device name (block 340). The friendly device name may be displayed together with the device address and device class of the selected Bluetooth® device.

The control unit 260 checks whether the user selects the Bluetooth® device name on the display unit 240 (block 345). The user may select one of the listed Bluetooth® device names through the input unit 250. When the user selects the Bluetooth® device name, the control unit 260 controls the Bluetooth® module 220 to establish a Bluetooth® connection to the Bluetooth® device with the selected device name (block 350).

When the user does not select the Bluetooth® device name, the control unit 260 checks whether a new Bluetooth® device search command is received from the user (block 355). The user may enter a new Bluetooth® device search command through the input unit 250. When a new Bluetooth® device search command is received, the control unit 260 returns to step 315 for finding a Bluetooth® device that can provide the next-highest priority Bluetooth® service in the service list. That is, when a new Bluetooth® device search command is received at step 355, the control unit 260 returns to step 315 and performs subsequent steps to find a Bluetooth® device that can provide the next-highest priority Bluetooth® service in the service list. When a new Bluetooth® device search command is not received, the control unit 260 may end the procedure.

As described above, in the Bluetooth® device search method, the mobile terminal 100 receives device address information and service information from Bluetooth® devices in the vicinity, and sends a device name request only to a selected Bluetooth® device that can provide a Bluetooth® service corresponding to the priority information given in the service list. In typical situations, while it takes a short time for the mobile terminal 100 to receive device address information and service information from nearby Bluetooth® devices, it takes a longer time to send a device name request and receive a corresponding device name response. The mobile terminal 100 sends a device name request to a specified number of responding Bluetooth® devices, not to all responding Bluetooth® devices. In general, a master Bluetooth® device sends a device name request to a Bluetooth® device conducting inquiry scan with strong output first. Hence, when a desired Bluetooth® device conducts inquiry scan with weak output, the master Bluetooth® device may not send a device name request to the desired Bluetooth® device, in which case the user may fail to find a desired Bluetooth® device. In the present invention, the master Bluetooth® device sends a device name request only to one or more responding Bluetooth® devices selected according to their service information. In other words, the mobile terminal 100 sends a device name request to a Bluetooth® device that can provide a Bluetooth® service desired by the user, and lists the device name thereof. Hence, the user may find a desired Bluetooth® device with ease.

Figure 4:
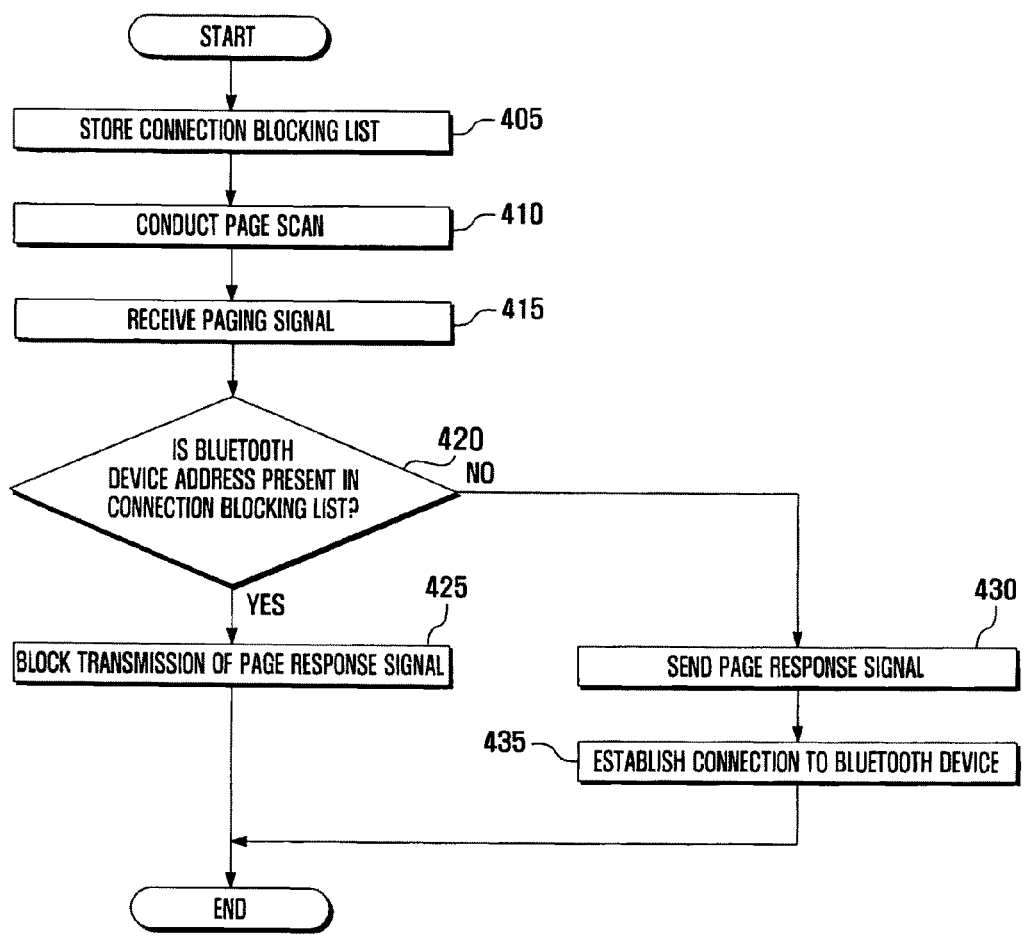
FIG. 4 illustrates a Bluetooth® device connection method according to another exemplary embodiment of the present invention.

FIG. 4 illustrates a Bluetooth device connection method according to another exemplary embodiment of the present invention. FIG. 4 depicts a case that the mobile terminal 100 acts as a slave device.

Referring to FIG. 4, the control unit 260 of the mobile terminal 100 stores a connection blocking list in the storage unit 230 (block 405). The user may make the connection blocking list using a blocking list setting menu.

When the user selects the blocking list setting menu, the control unit 260 controls the display unit 240 to display a menu screen for setting the connection blocking list. The menu screen may contain information regarding Bluetooth® devices that have been connected with the mobile terminal 100. Alternatively, the menu screen may contain information regarding Bluetooth® devices responding to an inquiry signal in the inquiry procedure.

The control unit 260 controls the Bluetooth® module 220 to conduct page scan (block 410). That is, the mobile terminal 100 listens for a paging signal from a nearby Bluetooth® device. When a nearby Bluetooth® device contains device information (for example, device address information and device name information) of the mobile terminal 100 through, for example, connection establishment in the past, the Bluetooth® device may directly send a paging signal to the mobile terminal 100 without performing an inquiry procedure.

The control unit 260 controls the Bluetooth® module 220 to receive a paging signal from a Bluetooth® device in the vicinity (block 415). The paging signal may carry the Bluetooth® device address (BD_ADDR) and clock information of the sender. The control unit 260 checks whether the received Bluetooth® device address is present in the connection blocking list (block 420). As described before, as the connection blocking list contains Bluetooth® device address information, the control unit 260 may compare the received Bluetooth® device address with the connection blocking list.

When the received Bluetooth® device address is present in the connection blocking list, the control unit 260 controls the Bluetooth® module 220 not to send a page response signal to the paging Bluetooth® device (block 425). The page response signal carries device access code (DAC) information, and the mobile terminal 100 may perform channel synchronization with the paging Bluetooth® device on the basis of the DAC information to establish a channel thereto. The control unit 260 may block establishment of a communication connection to the paging Bluetooth® device by not transmitting a page response signal to the paging Bluetooth® device.

Alternatively, when the received Bluetooth® device address is present in the connection blocking list, the control unit 260 may control the Bluetooth® module 220 to pause page scan for a preset time and to resume page scan after expiration of the preset time. A paging Bluetooth® device may repeatedly send a paging signal for a given time. The preset time may be set by default or by the user.

When the received Bluetooth® device address is not present in the connection blocking list, the control unit 260 controls the Bluetooth® module 220 to send a page response signal to the paging Bluetooth® device (block 430). There-after, the control unit 260 controls the Bluetooth® module 220 to receive a frequency hopping sequence (FHS) packet from the paging Bluetooth® device and to establish a communication connection to the paging Bluetooth® device (block 435).

As described above, the Bluetooth® device connection method blocks connection to an undesired Bluetooth® device to thereby facilitate communication with a desired Bluetooth® device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A Bluetooth device search method, the method comprising:
storing a service list, wherein the service list comprises Bluetooth services selected by a user;
receiving device information from one or more responding Bluetooth devices in response to a first Bluetooth device search request made by the user;
receiving device information from one or more responding Bluetooth devices in response to a second Bluetooth device search request made by the user when the user does not select a responding Bluetooth device in response to the first Bluetooth device search request made by the user;
selecting one of the responding Bluetooth devices that is capable of providing the Bluetooth service included in the service list;
transmitting a device name request signal to the selected Bluetooth device;
receiving a device name from the selected Bluetooth device; and
displaying the received device name.

2. The Bluetooth device search method of claim 1, wherein the device information of a responding Bluetooth device comprises information regarding at least one Bluetooth service provided by the Bluetooth device.

3. The Bluetooth device search method of claim 1, further comprising:
receiving the first Bluetooth device search request from the user; and
broadcasting the first Bluetooth device search request as an inquiry signal.

4. The Bluetooth device search method of claim 1, further comprising:
detecting selection of the displayed device name; and
establishing a connection with the Bluetooth device corresponding to the selected device name.

5. The Bluetooth device search method of claim 1, wherein the service list further comprises a priority selected by the user for each of the selected Bluetooth services, and wherein identifying the Bluetooth service comprises identifying the Bluetooth service based on the priorities of the selected Bluetooth services.

6. A Bluetooth device connection method, the method comprising:
receiving a paging signal from a requesting Bluetooth master device, wherein the paging signal comprises an address for the Bluetooth master device;
determining whether the address for the requesting Bluetooth master device is present in a connection blocking list;
blocking, when the address for the requesting Bluetooth master device is present in the connection blocking list, transmission of a paging response signal to the requesting Bluetooth master device; and pausing, when the address for the requesting Bluetooth master device is present in the connection blocking list, reception of another paging signal for a preset time.

7. The Bluetooth device connection method of claim 6, further comprising sending, when the address for the requesting Bluetooth master device is not present in the connection blocking list, a paging response signal to the requesting Bluetooth master device.

8. The Bluetooth device connection method of claim 6, further comprising:
receiving an address for a Bluetooth device from a user based on a selection of one of a plurality of Bluetooth devices previously connected; and
including the received address for the Bluetooth device in the connection blocking list.

9. The Bluetooth device connection method of claim 6, further comprising:
receiving an address for a Bluetooth device from a user based on a selection of a Bluetooth device responding to an inquiry signal; and
including the received address for the Bluetooth device in the connection blocking list.

10. A Bluetooth device connection method, the method comprising:
receiving a paging signal from a requesting Bluetooth master device, wherein the paging signal comprises an address for the Bluetooth master device;
determining whether the address for the requesting Bluetooth master device is present in a connection blocking list; and
pausing, when the address for the requesting Bluetooth master device is present in the connection blocking list, reception of another paging signal for a preset time.

11. The Bluetooth device connection method of claim 10, further comprising continuing, when the address for the requesting Bluetooth master device is not present in the connection blocking list, reception of another paging signal.

12. The Bluetooth device connection method of claim 10, further comprising:
receiving an address for a Bluetooth device from a user; and
including the received address for the Bluetooth device in the connection blocking list.

13. An apparatus for use in a portable terminal comprising a Bluetooth module, the apparatus comprising:
a storage unit configured to store a service list, wherein the service list comprises Bluetooth services selected by a user;
a control unit configured to:
receive device information from one or more responding Bluetooth devices in response to a first Bluetooth device search request made by the user;
receive device information from one or more responding Bluetooth devices in response to a second Bluetooth device search request made by the user when the user does not select a responding Bluetooth device in response to the first Bluetooth device search request made by the user;
select one of the responding Bluetooth devices that is capable of providing the identified Bluetooth service included in the service list;
transmit a device name request signal to the selected Bluetooth device; and
receive a device name from the selected Bluetooth device; and
a display unit configured to display the received device name.

14. The apparatus of claim 13, wherein the device information of a responding Bluetooth device comprises information regarding at least one Bluetooth service provided by the Bluetooth device.

15. The apparatus of claim 13, wherein the control unit is configured to receive a Bluetooth device search request from an input unit and to perform a Bluetooth device search in response to the received first Bluetooth device search request.

16. The apparatus of claim 13, wherein the control unit is configured to detect selection of the displayed device name and to establish a connection with the Bluetooth device corresponding to the selected device name.

17. The apparatus of claim 13, wherein the service list further comprises a priority selected by the user for each of the selected Bluetooth services, and wherein the control unit is configured to identify the Bluetooth service based on the priorities of the selected Bluetooth services.

18. An apparatus for use in a portable terminal having a Bluetooth module, the apparatus comprising:
a storage unit configured to store a connection blocking list; and
a control unit configured to receive a paging signal from a requesting Bluetooth master device, wherein the paging signal comprises an address for the Bluetooth master device, to determine whether the address for the requesting Bluetooth master device is present in the connection blocking list, and, when the address for the requesting Bluetooth master device is present in the connection blocking list, to block transmission of a paging response signal to the requesting Bluetooth master device and to pause reception of another paging signal for a preset time.

19. The apparatus of claim 18, wherein the control unit is further configured to send, when the address for the requesting Bluetooth master device is not present in the connection blocking list, a paging response signal to the requesting Bluetooth master device.

20. The apparatus of claim 18, wherein the control unit is further configured to continue, when the address for the requesting Bluetooth master device is not present in the connection blocking list, reception of another paging signal.

* * * * *